M. M. WELLS.
Grain Rake.

No. 110,613.

Patented Dec. 27, 1870.

Witnesses:
Chas. Kenyon.
Lillette Anderson.

Inventor:
M. M. Wells
Chipman Hosmer & Co.
Attorneys

UNITED STATES PATENT OFFICE.

MARCUS M. WELLS, OF HARTWICK, NEW YORK.

IMPROVEMENT IN GRAIN-RAKES.

Specification forming part of Letters Patent No. 110,613, dated December 27, 1870.

*To all whom it may concern:*

Be it known that I, MARCUS M. WELLS, of Hartwick, in the county of Otsego and State of New York, have invented a new and valuable Improvement in Grain-Rake; and I do hereby declare that the following is a full, clear, and exact description of the construction and operation of the same, reference being had to the annexed drawing, making a part of this specification, and to the letters and figures of reference marked thereon.

Figure 1:
Figure 2:
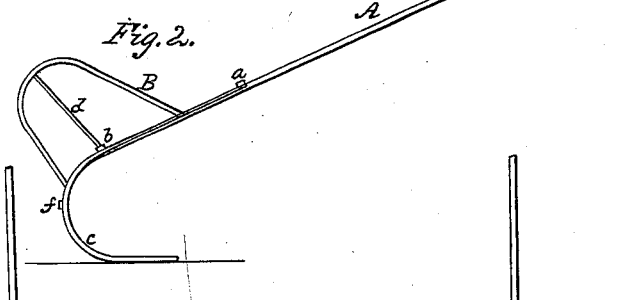
Figure 3:
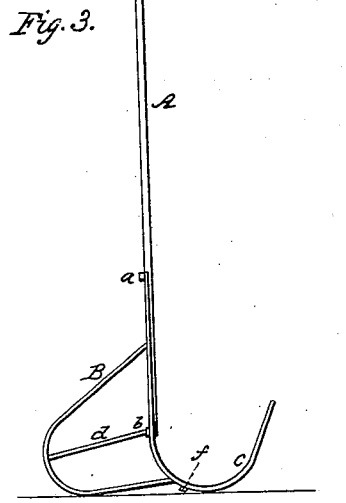
Figure 4:
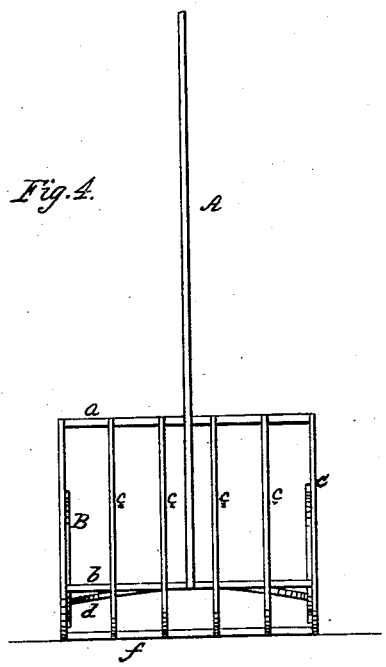

Figure 1 of the drawing is a representation of my invention in operation. Fig. 2 is a side view. Fig. 3 is a view of the rake in its vertical position. Fig. 4 is a plan view.

My invention relates to grain-rakes; and consists in the novel construction and arrangement of devices whereby the operation of raking and binding wheat and other grains is greatly facilitated.

A of the drawing represents a straight handle, to which is attached the cross-bar $b$, at a suitable distance from the end, while a similar bar, $a$, is secured to the end thereof. At proper distances along these two bars are attached the rake-teeth $c$ $c$. These teeth are parallel to each other, and from the bar $a$ to the bar $b$ they are straight, forming a platform, $z$, on which the sheaf is bound, as will be shown hereafter. As these teeth pass forward from the bar $b$ they are curved downward and inward, as shown in Fig. 2. When the handle is inclined, as in position for raking, the ends of the teeth are nearly horizontal. At a suitable distance down this curve, and parallel to the bar $b$, is attached another cross-bar, $f$, which is secured to each tooth, rendering them firm and secure.

On the upper side of the rake, and to the two outside teeth, are erected the rocker-shaped arms B and C. These arms are rendered firm by having the ends of the curved brace $d$ attached to them at their lowest points, the center of this brace being secured in a proper manner to the center of the cross-bar $b$.

The superiority of a rake constructed in this manner consists in the fact that it requires but one forward movement to collect a sufficient quantity of grain to form a bundle, whereas in the use of the common hand-rake the raker is obliged to turn round and rake back enough to form a bundle. Again, with my improvement no difficulty will be found in working among long stubble, or on rough and uneven ground. The operator has simply to draw the rake forward in the swath until he has resting against the concave side of the teeth sufficient grain to form a bundle. Drawing the points of the teeth past his foot, he raises the handle A into a vertical position, as shown on Fig. 3, and then lets it fall gently backward until the bar $a$ rests against his knee. The rockers B and C now act as legs, and lift the grain away from the ground to such a height that the sheaf can be readily and easily bound without the exertion of stooping down, as is necessary when working with a common hand-rake.

What I claim as my invention, and desire to secure by Letters Patent, is—

The rake and binding apparatus herein described, when constructed with concave teeth $c$, binding-platform $z$, and bent arms B and C, substantially as specified.

In testimony that I claim the above I have hereunto subscribed my name in the presence of two witnesses.

MARCUS M. WELLS.

Witnesses:
ESLI R. NORTON,
PALMER G. WILLIAMS.